(12) United States Patent
Stokes et al.

(10) Patent No.: US 8,424,022 B2
(45) Date of Patent: Apr. 16, 2013

(54) DEVICE DRIVER SYSTEM

(75) Inventors: Peter Stokes, Woking (GB); Michael Percy, Vancouver (CA)

(73) Assignee: Creative Technology Ltd, Singapore (SG)

( * ) Notice: Subject to any disclaimer, the term of this patent is extended or adjusted under 35 U.S.C. 154(b) by 1827 days.

(21) Appl. No.: 10/849,747

(22) Filed: May 19, 2004

(65) Prior Publication Data
US 2004/0230988 A1  Nov. 18, 2004

Related U.S. Application Data

(63) Continuation of application No. PCT/GB02/05233, filed on Nov. 20, 2002.

(30) Foreign Application Priority Data

Nov. 21, 2001 (GB) .................................. 0127865.4

(51) Int. Cl.
G06F 3/00 (2006.01)
G06F 9/44 (2006.01)
G06F 9/46 (2006.01)
G06F 13/00 (2006.01)

(52) U.S. Cl.
USPC ............................ 719/321; 719/322; 719/327

(58) Field of Classification Search .................. 719/321, 719/322, 327
See application file for complete search history.

(56) References Cited

U.S. PATENT DOCUMENTS

| 5,687,376 | A | 11/1997 | Celi et al. |
|---|---|---|---|
| 6,240,468 | B1 | 5/2001 | Capelli |
| 6,298,370 | B1 * | 10/2001 | Tang et al. ................. 718/102 |
| 6,460,151 | B1 * | 10/2002 | Warwick et al. ............ 714/718 |
| 6,646,195 | B1 * | 11/2003 | Puryear .......................... 84/626 |
| 7,093,265 | B1 * | 8/2006 | Jantz et al. ................... 719/321 |
| 7,237,101 | B1 * | 6/2007 | Dono et al. ...................... 713/1 |
| 2002/0110150 | A1 * | 8/2002 | Keys .............................. 370/493 |

FOREIGN PATENT DOCUMENTS

| EP | 0506278 A | 9/1992 |
|---|---|---|
| EP | 0646865 A | 4/1995 |

OTHER PUBLICATIONS

J. Joseph Prabhu and D. Narayanan; I/O File System Filter Driver for Windows NT; Jan. 1999; 17 pages; archived Apr. 9, 2001; retrieved Sep. 13, 2011.*

Kumar K B Saravan and V Logambal; WDM USB Video Streaming Filter Driver; Nov. 26, 1999; 16 pages; archived Nov. 21, 2000; retrieved Sep. 13, 2011.*

* cited by examiner

*Primary Examiner* — S. Sough
*Assistant Examiner* — Kimberly Jordan
(74) *Attorney, Agent, or Firm* — Creative Technology Ltd

(57) ABSTRACT

The invention relates to systems for driving computer peripherals having features, such as 3D sound capability, which are not envisaged by generic operating system for the computer. In order to adapt computers subject to existing operating systems, such as the Microsoft Windows family of systems, to such peripherals for which there is thus no driver capability, the invention provides a device driving system including additional driver, interposed between the operating system and an existing installed driver and configured to interface directly with the operating system. The additional driver is preferably also configured to interface with the existing installed driver.

15 Claims, 1 Drawing Sheet

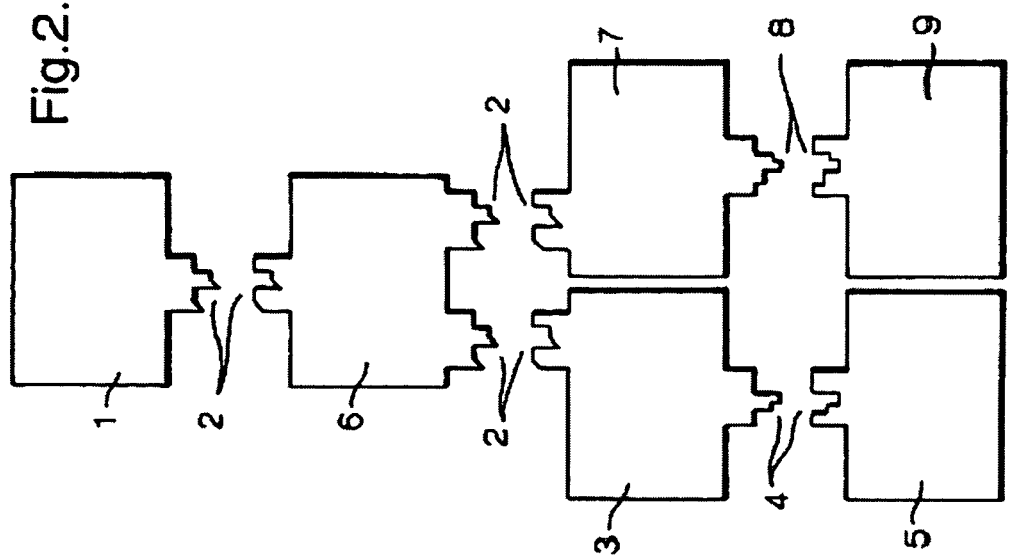
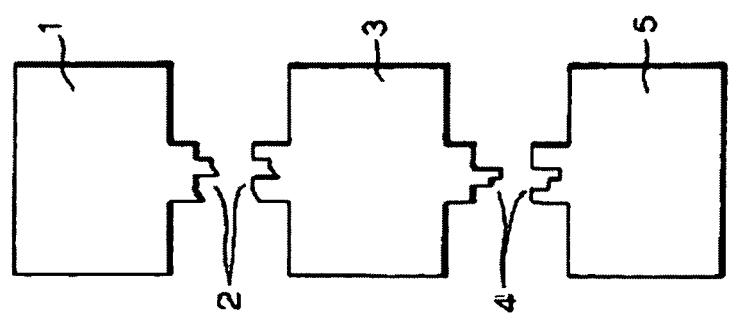

DEVICE DRIVER SYSTEM

CROSS-REFERENCE TO RELATED APPLICATIONS

This application is a continuation of International Application Number PCT/GB02/05233, with an international filing date of Nov. 20, 2002, and designating the United States and which in turn claims priority to UK application No. 01227865.4, filed on Nov. 21, 2001.

BACKGROUND OF THE INVENTION

1. Field of the Invention

This invention relates to systems for driving computer peripherals that have features which are not envisaged by the generic operating system for the computer, and it relates especially, though not exclusively, to the implementation of 3D sound capability via Universal Serial Bus (USB) audio hardware.

2. Description of the Related Art

The Microsoft Windows family of operating systems is currently widespread and dominant in the computer market and hence all audio-related peripheral devices, such as sound cards and loudspeakers, are built to comply with a suitable Windows interface. However there are certain features, such as 3D positioning of sounds and environmental effects, that are not specifically catered for by the system provider and for which there is thus no driver capability.

Windows provides well-defined interfaces between the operating system and drivers for envisaged devices; the interface in each case being defined by a Windows Driver Model (WDM). The WDM specification covers drivers for all envisaged devices and there are detailed sections of the specification that relate to a range of device classes, such as printers, graphics and audio devices. These more detailed sections specify the content and form of the information that must flow through the WDM interface in order to achieve the envisaged functionality of the respective device classes.

Unfortunately, there is no simple way of enabling the system to perform functionalities that have not been incorporated into the drivers by the provider of the operating system.

FIG. 1 of the accompanying drawings illustrates schematically the relationship between an operating system 1, a WDM audio driver 3 and a hardware device 5; the system 1 being linked to the driver 3 by means of a WDM interface 2 and the driver 3 being linked to the hardware 5 by means of an interface 4.

The WDM interface 2 dictates that all communication between the operating system 1 and the device driver 3 is conveyed as Input/Output Request Packets (IRPs); these being memory data structures of predefined format that are initialized with data pertaining to a required operation. IRPs can carry information both from and to the driver 3 as well as an instruction to perform a function and, for every required operation, the operating system creates one or more IRPs that are sent to the device driver. The device driver is then required to respond in a prescribed manner, according to the WDM specification.

If it is desired to employ, in such an environment, a hardware application for which the device driver is not configured, such as that required to achieve 3D sound capability, then the functionality of the device driver needs to be altered and/or augmented. However the two most direct methods available for putting such alteration and/or augmentation into effect both have significant drawbacks associated with them.

In order, for example, to modify the source code for the driver, one naturally needs to have access to the source code. That for Microsoft's USB audio driver is not available for alteration and, even if it were, there would be concerns about the alterations creating unexpected ramifications in other areas of the functionality.

If, on the other hand, one were to incorporate a WDM filter driver, allowing modifications to be made to the stream of IRPs flowing between the operating system and the driver, different problems could arise. In particular, because the IRP data structure is designed to implement generic communications between the operating system and the device driver of a generic device, the IRPs transmitted do not always map simply on to the complex operations being requested. Thus it is often impractical to augment the existing functionality of the base device in this way because there are insufficient features upon which to build.

The invention aims to provide a device driver system which can enable, without incurring the drawbacks referred to above, the implementation of functionalities not catered for by the provider of the operating system.

SUMMARY OF THE INVENTION

To achieve the foregoing, the present invention provides a device driver system. According to the invention there is provided, in a software-implemented arrangement for driving at least one hardware device of predetermined functionality from an operating system that communicates with an installed driver for said hardware device, a device driving system enabling operation of at least one further hardware device of functionality differing from said predetermined functionality and unsupported by said software system; the device driving system including additional driver means interposed between the operating system and the said installed driver and configured to interface directly with at least said operating system.

In one embodiment a computer readable medium comprising executable instructions that cause a computer to generate a supplemental device driver for positioning between an operating system and at least one installed audio driver provided with the operating system and coupled to an audio card device is provided.

Preferably, the additional driver means is also configured to interface directly with said installed driver, thereby enabling continued and unchanged use of said at least one hardware device of predetermined functionality.

In a further preferred arrangement, the said additional driver means is additionally configured to interface with, a further driver which is configured to drive an additional hardware device. This permits the original at least one hardware device to continue in use in conjunction with the additional hardware device.

Preferably said hardware devices are audio devices and in particular the original at least one device comprises USB audio hardware and the additional device comprises hardware associated with 3D positioning of sounds or environmental effects.

In one preferred embodiment the operating system is the Windows operating system and the said installed driver comprises a Windows Driver Model (WDM) audio driver.

These and other features and advantages of the present invention are described below with reference to the drawings.

BRIEF DESCRIPTION OF THE DRAWINGS

FIG. 1 of the accompanying drawings illustrates schematically the relationship between an operating system 1, a WDM audio driver 3 and a hardware device 5.

FIG. 2 shows, in schematic form similar to that of FIG. 1, a device driver system in accordance with one embodiment of the present invention.

DETAILED DESCRIPTION OF PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

According to the invention there is provided, in a software-implemented arrangement for driving at least one hardware device of predetermined functionality from an operating system that communicates with an installed driver for said hardware device, a device driving system enabling operation of at least one further hardware device of functionality differing from said predetermined functionality and unsupported by said software system; the device driving system including additional driver means interposed between the operating system and the said installed driver and configured to interface directly with at least said operating system.

Preferably, the additional driver means is also configured to interface directly with said installed driver, thereby enabling continued and unchanged use of said at least one hardware device of predetermined functionality.

In a further preferred arrangement, the said additional driver means is additionally configured to interface with, a further driver which is configured to drive an additional hardware device. This permits the original at least one hardware device to continue in use in conjunction with the additional hardware device.

Preferably said hardware devices are audio devices and in particular the original at least one device comprises USB audio hardware and the additional device comprises hardware associated with 3D positioning of sounds or environmental effects.

In one preferred embodiment the operating system is the Windows operating system and the said installed driver comprises a Windows Driver Model (WDM) audio driver. This invention thus provides, under the control of a specific operating system, for the operation of hardware envisaged by the provider of the system and additional hardware not envisaged by the system provider, and is thus distinguished from systems, such as that described in EP-A-0 798 637, for adapting an application program to communicate with a device driver in a different operating environment or device driver systems, such as that described in EP-A-0 506 278, intended to be generic to a plurality of different operating systems.

In order that the invention may be clearly understood and readily carried into effect, one embodiment thereof will now be described, by way of example only, with reference to the accompanying drawings, of which:

FIG. 1 has already been referred to and FIG. 2 shows, in schematic form similar to that of FIG. 1, a device driver system in accordance with one embodiment of the present invention. With reference back to FIG. 1, it will be recalled that the driver 3 which, in this example, is a WDM audio driver, is disposed intermediate the windows operating system 1 and the USB audio hardware 5. The audio driver 3 can be conceptually regarded as comprising three entities respectively performing the following functions:
 (a) managing the interface between the operating system 1 and the driver 3, in particular with regard to processing and responding to IRPs;
 (b) processing the data fed into the driver 3 and
 (c) managing the hardware device, such as by writing control values into registers.

The present invention is concerned, as has been stated, with permitting the usage of hardware devices which are not catered for by the operating system 1, without adversely affecting the functionality of hardware devices originally supported by the operating system 1, and one way of implementing the invention will now be described with reference to FIG. 2.

In FIG. 2, components and functions common to FIG. 1 carry the same reference numbers, and it will be seen that there is essentially provided a new device driver 6. The driver 6 is interposed between the operating system 1 and the WDM driver 3, and replicates the interface 2 at its interfaces with both.

The new driver 6 resembles driver 3 and its three functional entities are arranged to perform the following functions:
 (a) responding to IRPs from the system 1 in the correct manner, offering all required functionality;
 (b) performing all necessary processing of the data in order to provide the required functionality; and
 (c) communicating with the driver 3 using the same IRP structures that the operating system 1 would normally use.

Since the new driver 6 communicates directly with the operating system 1, it is able to offer any required features. The original manufacturer's driver 3 is communicated with from the new driver 6 in a manner which is indistinguishable from direct communication with the operating system, and it therefore functions normally, with the audio being produced by the hardware 5, thus the hardware which it drives can comprise the original device 5 or a new and previously unsupported device such as a 3D sound system.

In the event that it is desired to maintain drive control over existing audio devices whilst further providing drive for a new device, the device driver 6 can be provided with one or more additional WDM interfaces, as shown in FIG. 2; all of such additional interfaces being identical to the interface 2. This permits the operation of optional additional hardware devices such as 9 by way of additional WDM audio drivers such as 7 operating over respective interfaces such as 8.

The approach described herein of utilizing a new driver such as 6 with which the operating system 1 communicates directly, offers a number of advantageous features, as follows:
 1) existing audio device drivers remain in use, thereby making optimum use of available drivers without alteration. Retrofitting to any WDM compliant audio device is thus facilitated;
 2) The implementation of the WDM specification by the new driver (6) is indistinguishable from that of a standard device driver, thus no alterations are required either to the operating system or the applications executed under it;
 3) The WDM specification is implemented on all recent versions of the Microsoft Windows family of operating systems and thus it is possible to use the same approach and, indeed, the same device driver, on all such versions; and 4) extended functionality can be offered by using multiple input and output devices.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A device driver system implemented in a computer and configured for providing communications between an operating system and at least one installed device driver provided with the operating system and coupled to a first hardware device, the device driver system comprising:
    the operating system;
    the at least one installed device driver;
    the first hardware device; and
    a supplemental device driver interposed between the operating system and the at least one installed device driver, the supplemental device driver configured to:
        receive a first communications for an operation directly from the operating system at a first input interface between the operating system and the supplemental device driver; and
        forward a second communication for the operation over a first output interface to a first of the at least one installed device driver, wherein the second communication causes the driver to generate functionality envisaged by the operating system provider when the coupled first hardware device supports the predetermined functionality and to generate functionality not envisaged by the operating system provider when the coupled first hardware device has functionality beyond the predetermined functionality;
    wherein the at least one installed device driver comprises a second driver coupled to a second hardware device and the supplemental device driver is further configured to forward the second communication to the second driver; and
    wherein the first hardware device has predetermined functionality envisaged by the operating system provider and the second hardware device has functionality beyond the predetermined functionality.

2. The system according to claim 1 wherein said first hardware device comprises an audio device.

3. The system according to claim 1 wherein said first hardware device comprises USB audio hardware and the second hardware device comprises hardware associated with 3D positioning of sounds or environmental effects.

4. The system according to claim 1 wherein the operating system is the Windows operating system and the at least one installed device driver comprises a Windows Driver Model (WDM) audio driver.

5. The system according to claim 1, wherein the supplemental device driver is further configured to communicate with said operating system in the same manner that the at least one installed device driver is configured to communicate with said operating system in the absence of the supplemental device driver.

6. A non-transitory computer readable medium comprising executable instructions that cause a computer to generate a supplemental device driver for positioning between an operating system and at least one installed device driver provided with the operating system and coupled to a first hardware device, the supplemental device driver configured to:
    receive a first communications for an operation directly from the operating system at a first input interface between the operating system and the supplemental device driver; and
    forward a second communication for the operation over a first output interface to a first of the at least one installed device driver, wherein the second communication causes the driver to generate functionality envisaged by the operating system provider when the coupled first hardware device supports the predetermined functionality and to generate functionality not envisaged by the operating system provider when the coupled first hardware device has functionality that is beyond the predetermined functionality;
    wherein the at least one installed device driver comprises a second driver coupled to a second hardware device and the supplemental device driver is further configured to forward the second communication to the second driver; and
    wherein the first hardware device has predetermined functionality envisaged by the operating system provider and the second hardware device has functionality beyond the predetermined functionality.

7. The computer readable medium according to claim 6, wherein said first hardware device comprises an audio device.

8. The computer readable medium according to claim 6, wherein said first hardware device comprises USB audio hardware and the second hardware device comprises hardware associated with 3D positioning of sounds or environmental effects.

9. The computer readable medium according to claim 6, wherein the operating system is the Windows operating system and the at least one installed device driver comprises a Windows Driver Model (WDM) audio driver.

10. The computer readable medium according to claim 6, wherein the supplemental device driver is further configured to communicate with said operating system in the same manner that the at least one installed device driver is configured to communicate with said operating system in the absence of the supplemental device driver.

11. A computer implemented method for providing communications between an operating system and at least one installed device driver provided with the operating system and coupled to a first hardware device, a supplemental device driver interposed between the operating system and the at least one installed device driver, the method comprising:
    receiving a first communications for an operation directly from the operating system at a first input interface between the operating system and the supplemental device driver; and
    forwarding a second communication for the operation over a first output interface to a first of the at least one installed device driver, wherein the second communication causes the driver to generate functionality envisaged by the operating system provider when the coupled first hardware device supports the predetermined functionality and to generate functionality not envisaged by the operating system provider when the coupled first hardware device has functionality beyond the predetermined functionality;
    wherein the at least one installed device driver comprises a second driver coupled to a second hardware device and the supplemental device driver is further configured for forwarding the second communication to the second driver; and wherein the first hardware device has predetermined functionality envisaged by the operating system provider and the second hardware device has functionality beyond the predetermined functionality.

12. The method as recited in claim 11 wherein the first hardware device is a USB audio card and the second hardware device comprises hardware associated with 3D positioning of sounds.

13. The method according to claim 11, wherein said first hardware device comprises an audio device.

14. The method according to claim 11, wherein the operating system is the Windows operating system and the at least one installed device driver comprises a Windows Driver Model (WDM) audio driver.

15. The method according to claim 11, wherein the supplemental device driver is further configured for communicating with said operating system in the same manner that the at least one installed device driver is configured for communicating with said operating system in the absence of the supplemental device driver.

* * * * *